June 29, 1926.

A. ZOPP 1,590,488

FRET SAW

Filed April 16, 1923　　3 Sheets-Sheet 1

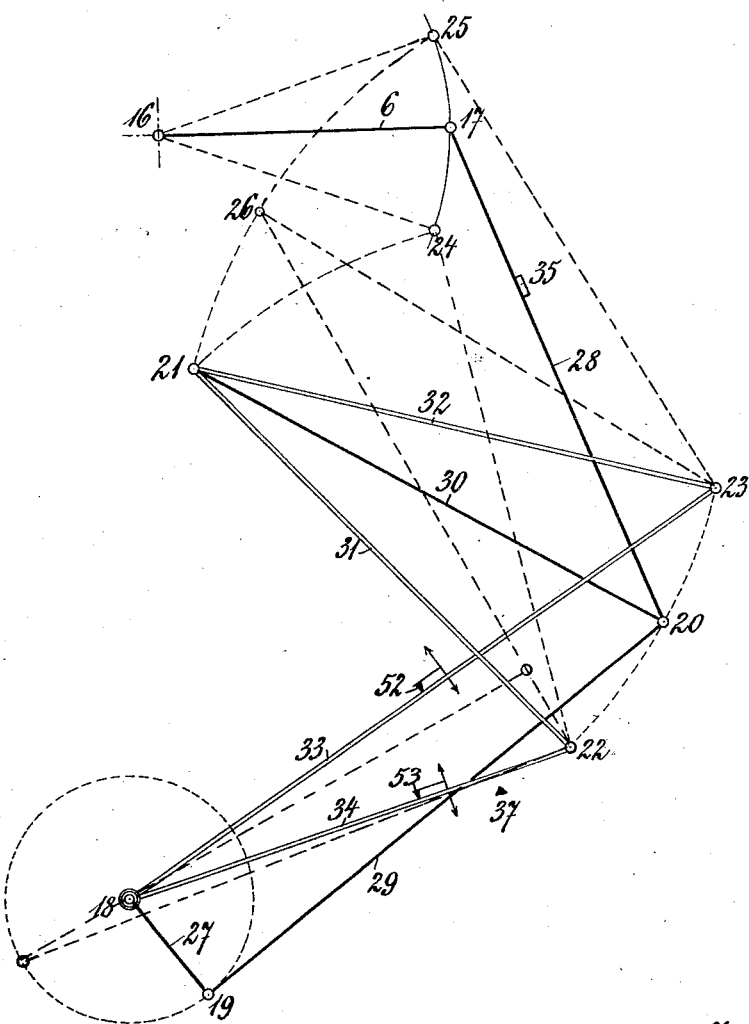

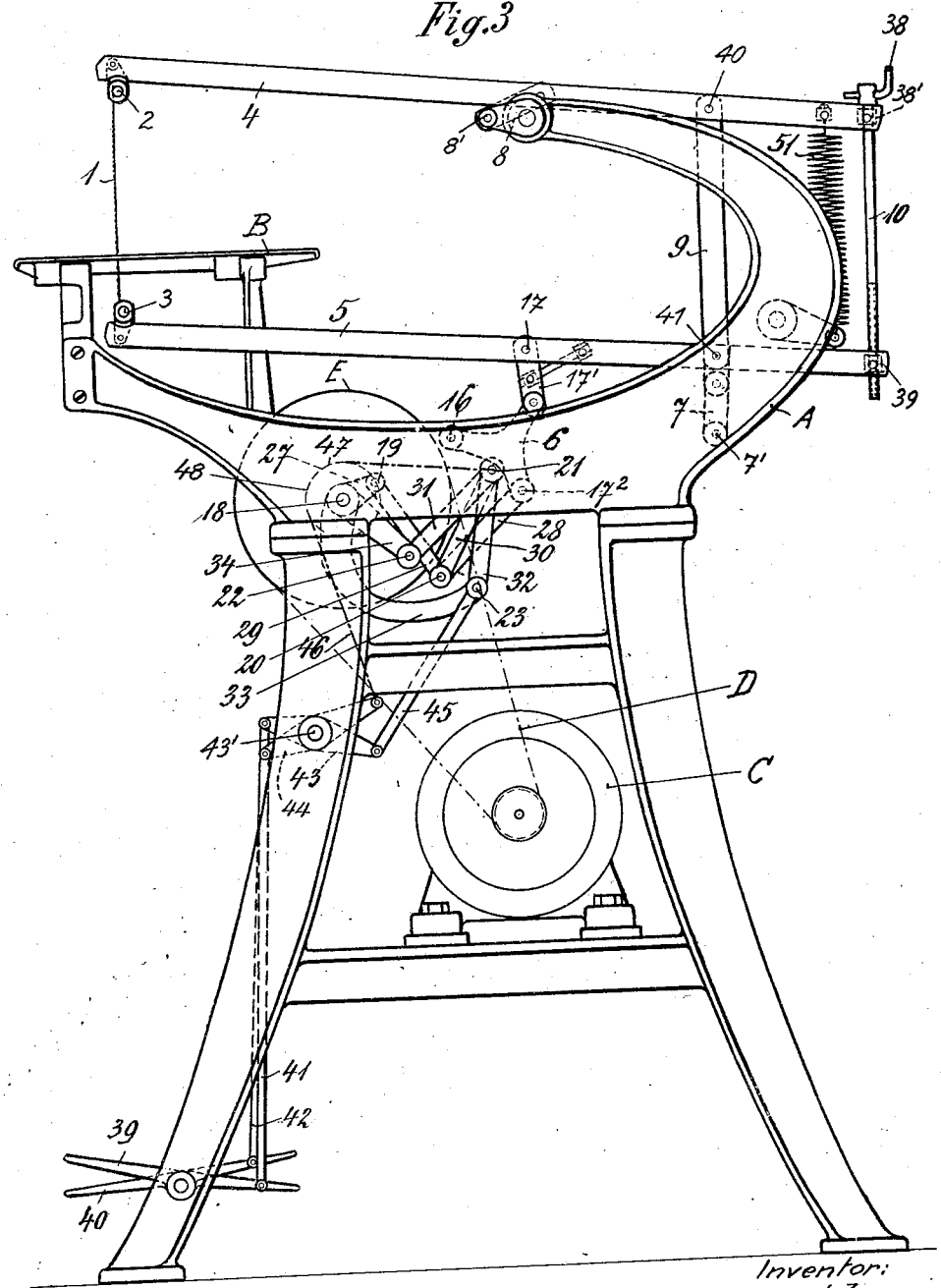

Patented June 29, 1926.

1,590,488

UNITED STATES PATENT OFFICE.

AUGUST ZOPP, OF MÖDLING, NEAR VIENNA, AUSTRIA.

FRET SAW.

Application filed April 16, 1923, Serial No. 632,507, and in Austria April 19, 1922.

This invention relates to sawing machines and more especially to mechanical fret saws the blade of which is secured in clamping jaws which are guided in straight lines by approximately elliptical motion and to which jaws motion is imparted by a rotating crank. It is known in the art to which this invention appertains to connect by a strut the two arms to which the clamping jaws are secured. In my invention this strut is designed to form one of the links of the elliptical motion, so that the forces resulting from the tension of the saw are not transferred to the frame of the machine.

In the drawings affixed to this specification and forming part thereof a machine embodying my invention is illustrated diagrammatically by way of example.

In the drawings

Fig. 2 is an elevation, also diagrammatic, but on a larger scale, of the drive of the machine, and Fig. 3 is an elevation of a complete machine.

Figure 1:
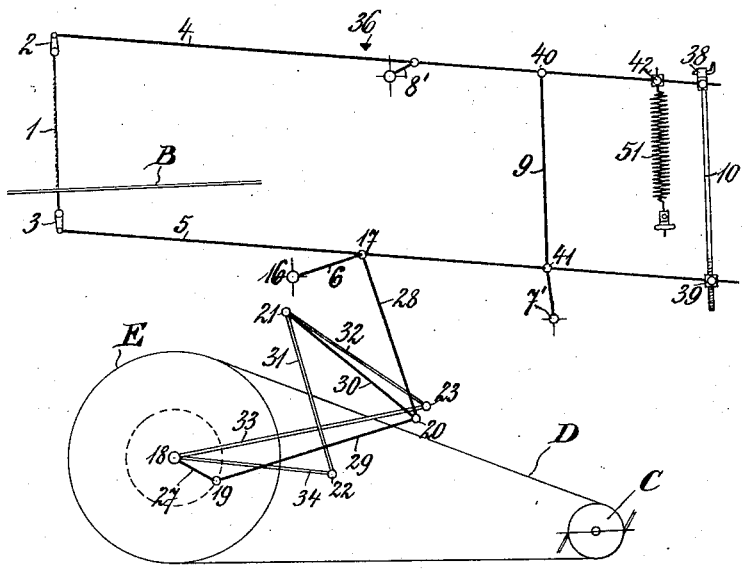
Fig. 1 is a diagrammatic elevation of the machine.

The saw blade 1 is held in clamping jaws 2 and 3 which are secured to arms 4 and 5. The arm 5 to which the lower jaw 3 is secured, is guided by links 6 and 7 which are fulcrumed in the frame A of the machine (not shown in Figs. 1 and 2) at 16 and 7', respectively, and connected to the arm 5 at 17 and 41, respectively. These links constitute an approximately elliptical motion, of the well known kind. The arm 4 to which the upper jaw 2 is secured, is guided by a link 8 fulcrumed in the frame A of the machine at 8' and a strut 9 which is pivotally connected to both arms 4 and 5 at 40 and 41, respectively. Tension is put on the saw blade 1 by means of a spindle 10 which is inserted in a trunnioned block 39 carried by the arm 5 with its threaded end and adapted to be turned by a crank 38 which is supported on the other arm 4 by means of another trunnioned block 38'. In this manner it is possible to adapt the position of the arms to blades of various length and thickness. The strut 9 is, kinematically, so determined that it is apt to serve as a member of the straight-line motion guiding the jaw 2. Thus, the frame as well as the driving means are, therefore, relieved completely from forces originating in, or resulting from, the tension of the blade.

The stroke of the machine is limited by the consideration that its arms must be able to perform their respective motions without meeting obstructions even with the thickest blanks and the maximum inclination of the machine table B. If the stroke were constant it would not be fully utilized when sawing thinner blanks and the operation would be still more unfavorable, if a longer blade were used. This circumstance, as well as the desire to use shorter strokes at difficult points renders the use of a drive necessary which allows the stroke as well as the position of the saw motion to be varied during the operation of the machine. To this end it is necessary to vary the rocking motion of the link 6. In Fig. 1 the link 6 is shown as directly pivoted to the arm 5 while in the machine shown in Fig. 3 a short link 17' is inserted between the end of the link 6 and the arm 5. Obviously, this makes no difference in the mode of operation of the parts. Motion is imparted to the link 6 by a crank 27 on a shaft 18 the pin 19 of which is connected with a pin 20 of a link 28 by a connecting rod 29. The pin 20 is connected with the pin 17 by a pitman 28. In Fig. 3 this pitman is shown as pivoted to a pin $17^2$ on the link 6 while in Fig. 1 it is shown as directly pivoted to the pin 17 and the arm 5. The pin 20 is guided by means of a rocker 30 which is adapted to rock about a pin 21.

Any suitable means may be employed for imparting rotation for the shaft 18, for instance a motor C and a belt D moving over a pulley E on the shaft 18.

When the crank 27 rotates, the pin 20 moves through an arc 22, 23 as shown in Fig. 2. This motion is transmitted to the pin 17 by the pitman 28 so that the pin 17 is moved through the arc 24, 25. The pin 21 is adapted to be displaced by means which will presently be described. When the pin 21 is displaced into the position indicated at 26 in Fig. 2, the position and the length of the arc through which the pin 20 moves is altered and in consequence the position and the length of the arc through which the pin 17 moves are also altered. It is possible to find a definite position of the pin 22 for any desired position and length of the arc which the pin 17 describes. Supposing, for instance, that the position of the link 6 be that indicated by the dotted line 16/25, and that it be desired that its deflection be zero, which means that this link is at rest while the other parts of the mechanism continue operating, the pin 21 should be shifted to the point 25.

The pin 21 is displaced through the medium of links 31 and 32, the ends 22 and 23 of which are connected with levers 33 and 34 adapted to turn about the shaft 18. In Fig. 2 the mechanism for adjusting the position of the pin 21 is indicated by double lines while the parts of the drive are indicated by full lines. The parts 28, 30, 31, and 32, are all of the same length, but the lever 33 is longer than the lever 34 by the diameter of the circle described by the crank pin 19.

Supposing the lever 33 to be fixed in the position shown in the drawing, and supposing the lever 34 to be swung into various positions so as to make the link 32 swing around the pin 23 by the intermediary of the rod 31 and the pin 21, this latter will oscillate the pin 17 by the intermediary of the rod 30, the pin 20, and the rod 28, the oscillations of the pin 17 extending always to the point 25, but never beyond it. If, on the contrary, the lever 34 is fixed in its position and the lever 33 is rocked, the pin 17 is swung in the direction towards point 24 and its path extends to this point, but never passes beyond it.

Briefly summarized, the position of the lever 33 determines the upper end of the path of the pin 17; the position of the lever 34 determines the lower end of this path.

If both levers 33 and 34 are so moved that the pins 17 and 21 coincide, the rocker 30 and the pitman 28 coincide also irrespective of the position of the crank 27, and the pin 17 remains at rest when the crank rotates. If the parts 28 and 31 are connected with each other, for instance, by a member 35 secured to the pitman 28, the pin 17 may be oscillated by reciprocating the lever 33, independently of the rotation of the crank 27, for instance by means of a treadle.

The pin 21 may be adjusted by any suitable means, such as two treadles 39 and 40 which are connected by rods 41 and 42 with double-armed levers 43 and 44 fulcrumed at 43' in the frame A. The lever 43 is connected with the pin 23 by a rod 45 and a chain 46 is secured to the free end of the lever 44 and passes over a pulley 47 on the shaft 18 and is attached to a pin 21.

The mechanism, or the driving gear, respectively described thus renders possible the following operations:—

(a) Starting the driving motor without the saw blade commencing to move.

(b) Initiating the blade motion from the stroke zero to a selected maximum stroke, whereby the blade length at disposal for the time being is utilized to the highest degree possible.

(c) Returning to the stroke zero in spite of continued running of the driving motor, in connection with passing over to manual or foot-drive, at particularly difficult points.

A coiled pull-back spring 51 is attached to the upper beam 4 which arrests the motion when the blade 1 breaks. Means are provided for regulating the tension of said spring in proportion to the forces of inertia, which are a function of the number of revolutions of the crank shaft 18. It will be understood that the spring 51 can only be relied on to perform its work properly if its tension is proportioned to the inertia forces or, which is the same, to the number of revolutions of the shaft 18. When the blade 1 breaks, the tension of the spring pulls the levers 28, 33 and 34 against their respective abutments 35, 52 and 53. In normal operation, the tension of the spring 51 must overcome the frictional resistance of the blade 1 in the cut, and gravity. As the saw blade is inserted as an intermediate member into the power way 51—4—2—1—3—5—28—29—27, the effect of the spring 51 on the driving mechanism is nil. If the blade should break, the upper arm 4 gives way in upward direction until it contacts with the abutment 36 (Figure 1) the block 38 gliding down along the unthreaded upper part of the tensioning rod 10. The lower guide rod 5 makes the lever 34 contact with the abutment 37 (Figure 3) by its weight which is transmitted to the lever 34 by the intermediary of the parts 28, 30, and 31; thereafter the same weight acts on the rocker 30 which is moved downwards until the pitman 28 contacts with the abutment 35. Thus, the two arms 4 and 5 move asunder instantly after a blade breaks, and remain in their diverging position when the crank continues to rotate.

I claim.—

1. Mechanical fret saw comprising a frame, a pair of beams adapted to hold a blade, means for imparting reciprocation to said beams, two links pivotally carried in said frame and pivoted to one of said beams, a single link also pivotally carried in said frame and pivoted to the other beam, and a strut inserted between and pivotally connected with said beams, the connection of said strut with said two-links beam being arranged in the vicinity of the pivot connecting one of said links to said beam.

2. Mechanical fret saw, comprising a frame, a pair of beams adapted to hold a blade, means for imparting reciprocation to said beams, two links pivotally carried in said frame and pivoted to one of said beams, a single link also pivotally carried in said frame and pivoted to the other beam, and a strut inserted between and pivotally connected with said beams, the connection of said strut with said two-links beam coinciding with the pivot connecting one of said links to said beam.

3. Mechanical fret saw comprising a frame, a pair of beams adapted to hold a blade, a rotary shaft carried in said frame, a crank on said shaft, a system of links and levers interposed between said crank and said beams, two links pivotally carried in said frame and pivoted to one of said beams, a single link also pivotally carried in said frame and pivoted to the other beam, a strut inserted between and pivotally connected with said beams, the connection of said strut with said two-links beam being arranged in the vicinity of the pivot connecting one of said links to said beam, and means for displacing one fulcrum of said system with regard to the point where one of the links of said two-links beam is pivotally carried in said frame.

4. Mechanical fret saw, comprising a frame, a pair of beams adapted to hold a blade, a rotary shaft carried in said frame, a crank on said shaft, a system of links and levers interposed between said crank and said beams, two links pivotally carried in said frame and pivoted to one of said beams, a single link also pivotally carried in said frame and pivoted to the other beam, a strut inserted between and pivotally connected with said beams, the connection of said strut with said two-links beam being arranged in the vicinity of the pivot connecting one of said links to said beam, and means for placing one fulcrum of said system in co-axial relation with regard to the fulcrum of one of the links of said two-links beam.

5. Mechanical fret saw comprising a frame, a pair of beams adapted to hold a blade, a rotary shaft carried in said frame, a crank on said shaft, a system of links and levers interposed between said crank and said beams, two links pivotally carried in said frame and pivoted to one of said beams, a single link also pivotally carried in said frame and pivoted to the other beam, a strut inserted between and pivotally connected with said beams, the connection of said strut with said two-links beam being arranged in the vicinity of the pivot connecting one of said links to said beam, and a spring secured to said frame at one end and to said one-link beam at the other and adapted to displace one fulcrum of said system with regard to the point where one of the links of said two-links beam is pivotally carried in said frame.

In testimony whereof I affix my signature.

A. ZOPP.